(12) United States Patent
Chen et al.

(10) Patent No.: US 11,638,485 B2
(45) Date of Patent: May 2, 2023

(54) DETACHABLE BED FRAME ASSEMBLY MECHANISM

(71) Applicant: JIAXING REST FURNITURE & APPLIANCE CO., LTD., Zhejiang (CN)

(72) Inventors: Jiguan Chen, Zhejiang (CN); Bing Chen, Zhejiang (CN); Qiangqiang Wu, Zhejiang (CN); Baoli Zhang, Zhejiang (CN); Jianjun Nie, Zhejiang (CN)

(73) Assignee: JIAXING REST FURNITURE & APPLIANCE CO., LTD., Zhejiang (CN)

( * ) Notice: Subject to any disclaimer, the term of this patent is extended or adjusted under 35 U.S.C. 154(b) by 0 days.

(21) Appl. No.: 17/317,347

(22) Filed: May 11, 2021

(65) Prior Publication Data

US 2021/0353070 A1    Nov. 18, 2021

(30) Foreign Application Priority Data

May 12, 2020  (CN) .......................... 2020207735175
Apr. 12, 2021  (CN) .......................... 2021103904120

(51) Int. Cl.
*A47C 19/00* (2006.01)
*A47C 19/02* (2006.01)
(Continued)

(52) U.S. Cl.
CPC .......... *A47C 19/005* (2013.01); *A47C 19/027* (2013.01); *A47C 20/048* (2013.01); *F16B 12/30* (2013.01); *F16B 12/54* (2013.01)

(58) Field of Classification Search
CPC ... A47C 19/005; A47C 19/027; A47C 19/025; A47C 19/021; A47C 20/048;
(Continued)

(56) References Cited

U.S. PATENT DOCUMENTS 1,768,435  A  *  6/1930  Bradshaw ............ A47C 19/021
                                                5/131
5,418,987  A  *  5/1995  Yoshino ............... A47C 19/045
                                                5/11

(Continued)

FOREIGN PATENT DOCUMENTS

BR     202015030718 U2  *  6/2017  ............... A47B 3/06
CN     106579858 A      *  4/2017
EP     2762041 A1       *  8/2014  ............ A47C 17/86

*Primary Examiner* — Peter M. Cuomo
*Assistant Examiner* — Alison N Labarge
(74) *Attorney, Agent, or Firm* — Global IP Services; Tianhua Gu

(57) ABSTRACT

The present invention relates to the field of bed frame structures, and in particular, to a novel detachable bed frame assembly mechanism. The novel detachable bed frame assembly mechanism includes a bed frame body. The bed frame body includes an outer frame, an inner frame, and two sets of wooden strips. The outer frame is a rectangular frame including two horizontal tubes, two lateral tubes, four L-shaped iron-plate connectors, bolts, and nuts. The inner frame includes at least one horizontal connecting tube, a plurality of lateral connecting tubes, iron sheets, bolts, and nuts. The two sets of wooden strips are symmetrically disposed on the horizontal connecting tube and the horizontal tubes on both sides of the horizontal connecting tube and are parallel to the lateral tubes, to connect the horizontal connecting tube to the horizontal tubes. The invention is easy to assemble and disassemble and is safe and reliable.

5 Claims, 15 Drawing Sheets

(51) Int. Cl.
*F16B 12/54* (2006.01)
*A47C 20/04* (2006.01)
*F16B 12/30* (2006.01)

(58) Field of Classification Search
CPC ....... A47C 17/86; A47C 19/04; A47C 19/045; F16B 12/30; F16B 12/54; A61G 7/002; A61G 7/012; A61G 7/015; A61G 7/018
See application file for complete search history.

(56) References Cited

U.S. PATENT DOCUMENTS

| | | | |
|---|---|---|---|
| 8,935,819 B1* | 1/2015 | Hartley | A47C 23/061 5/236.1 |
| 2016/0198860 A1* | 7/2016 | Salermo | A47C 19/005 5/200.1 |
| 2017/0156486 A1* | 6/2017 | Blick | B60B 33/0026 |
| 2017/0208955 A1* | 7/2017 | Lee | A47C 19/025 |
| 2018/0140103 A1* | 5/2018 | Thompson | A47C 19/025 |
| 2018/0192778 A1* | 7/2018 | Choi | A47C 19/005 |
| 2019/0142159 A1* | 5/2019 | Endelman | A63B 22/0089 248/188.8 |
| 2020/0078238 A1* | 3/2020 | Huang | A61G 7/012 |

\* cited by examiner

DETACHABLE BED FRAME ASSEMBLY MECHANISM

BACKGROUND

Technical Field

The present invention relates to the field of bed frame structures, and in particular, to a novel detachable bed frame assembly mechanism.

Related Art

Common bed frames are bulky, costly in packaging and transportation, and inconvenient to be moved into a house. Bed frames that can be easily disassembled for transportation are also present on the market, which, however, generally have a poor load-bearing capability. In addition, most current detachable beds are opened under a boosting force of a pneumatic rod having a large force value, which almost has no boosting force at the beginning as a result of an excessively small angle but may directly bounce as the boosting force increases with an increase in the angle, causing a hidden hazard of injuring people. During closing, as the angle becomes smaller, the boosting force is increasingly smaller and a closing speed is increasingly larger, directly causing fingers to be squeezed. Even after the pneumatic rod slowly fails, other serious safety hazards such as sudden falling of an upper cover, or the like are caused.

SUMMARY

In order to overcome the disadvantages of the prior art and provide a safe and reliable bed frame assembly mechanism that reduces transportation costs, increases a transportation volume, and is convenient to assemble and disassemble, the present invention discloses a novel detachable bed frame assembly mechanism.

The purpose of the present invention is achieved by using the following technical solutions:

A novel detachable bed frame assembly mechanism, including: a bed frame body including an outer frame, an inner frame, and at least one set of wooden strips, where the outer frame is a rectangular frame including two horizontal tubes, two lateral tubes, four L-shaped iron-plate connectors, bolts, and nuts, where the two horizontal tubes and the two lateral tubes are connected through L-shaped iron plates, one of the L-shaped iron plates is disposed on an inner side of one of two ends of each of the two horizontal tubes or each of the two lateral tubes, an opening of the L-shaped iron plate is orientated outward, one side of the L-shaped iron plate is connected to the inner side of the end of the horizontal tube or the lateral tube, an outer end surface of the L-shaped iron plate is flush with an outer end surface of the horizontal tube or the lateral tube, and the end of the lateral tube or the horizontal tube connected to the L-shaped iron plate is placed in the opening of the L-shaped iron plate and is fixed through the bolts and the nuts;

the inner frame includes at least one horizontal connecting tube, a plurality of lateral connecting tubes, iron sheets, bolts, and nuts, where the horizontal connecting tube is connected between the two lateral tubes and is parallel to the horizontal tubes, the plurality of lateral connecting tubes are connected between the horizontal tubes and the horizontal connecting tube and are parallel to the lateral tubes, the lateral connecting tubes on both sides of the horizontal connecting tube are symmetrically disposed, the horizontal connecting tube is connected to the lateral tubes at both ends of the horizontal connecting tube through the iron sheets and is fixed through the bolts and the nuts, the lateral connecting tubes are connected to the horizontal tubes through the iron sheets and are fixed through the bolts and the nuts, ends of the lateral connecting tubes on both sides of the horizontal connecting tube are symmetrically disposed on outer sides of the horizontal connecting tube through the iron sheets and are fixed through the nuts after interlocked through the bolts; and the wooden strips are symmetrically disposed on the horizontal connecting tube and the horizontal tubes on both sides of the horizontal connecting tube and are parallel to the lateral tubes, to connect the horizontal connecting tube to the horizontal tubes.

A novel detachable bed frame assembly mechanism, including: a bed frame body including an outer frame, an inner frame, and at least one set of wooden strips, where the outer frame is a rectangular frame including two door-shaped horizontal tubes, two lateral tubes, steel channels, bolts, and nuts, where one end of each of the steel channels is disposed within a port of a lateral end of each of the two door-shaped horizontal tubes, and the other end of the two steel channels is disposed within each of the two lateral tubes and is fixedly connected to the lateral tube through the bolts and the nuts;

the inner frame includes at least one horizontal connecting tube, iron sheets, bolts, and nuts, where the horizontal connecting tube is connected between the two lateral tubes and is parallel to the horizontal tubes, and the horizontal connecting tube is connected to the lateral tubes at both ends of the horizontal connecting tube through the iron sheets and is fixed through the bolts and the nuts; and the wooden strips are symmetrically disposed on the horizontal connecting tube and the horizontal tubes on both sides of the horizontal connecting tube and are parallel to the lateral tubes, to connect the horizontal connecting tube to the horizontal tubes.

The novel detachable bed frame assembly mechanism further includes: straps, where the wooden strips arranged in parallel are connected as a whole through one of the straps.

The novel detachable bed frame assembly mechanism further includes: a flip link mechanism, where the flip link mechanism includes a box mounting plate, an upper cover mounting plate, a first link, a second link, a pneumatic rod, a sliding link, a positioning slider, and a bump, where one end of the box mounting plate is connected to one end of the first link, the other end of the box mounting plate is connected to one end of the second link, the other end of the first link is connected to one end of the upper cover mounting plate, one end of the sliding link is connected in the middle of the second link, the other end of the sliding link is connected in the middle of the upper cover mounting plate, the positioning slider is slidable reciprocally in the sliding link along a guide bar and is rotatable by means of the bump below a sliding chute on the sliding link, and the other end of the second link is connected to the upper cover mounting plate and is located between the first link and the sliding link, one end of the pneumatic rod is connected to the other end of the upper cover mounting plate, and the other end of the pneumatic rod is located at a lower part of the sliding link and is connected in the middle of the second link.

The upper cover mounting plate is provided with mounting holes, the bed frame body is also provided with mounting holes, and the mounting holes of the upper cover mounting plate and the bed frame body are aligned with each other, a bolt-nut assembly is successively passed through the mounting holes of the upper cover mounting plate and the bed frame body and is fastened, so that the bed frame body is connected and fixed with the flip link mechanism.

The novel detachable bed frame assembly mechanism further includes: a booster tension spring, where the one end of the box mounting plate is connected to the one end of the first link through the booster tension spring.

The advantageous effects of the present invention are as follows. The packaging volume of products is significantly reduced, and the products may be directly transported by using a family car, which can reduce more transportation costs. In addition, the small packaging design can facilitate sales and can also facilitate movement in and out of a house, while can be assembled only by using simple tools. In addition, families can have more interaction and company and can experience the fun of DIY during the assembling. This application is applicable to all bed frame structures with or without functions currently present on the market. The flip link mechanism is adopted to provide a boosting force during opening and closing of the upper cover, which avoids safety hazards such as injury to a person caused by bouncing as a result of violent opening and squeezing hands and human bodies as a result of an excessively large closing speed. In addition, the link mechanism of this application is more stable during opening and closing, and is applicable to both a box structure and a wall bed structure.

DETAILED DESCRIPTION

Figure 1:
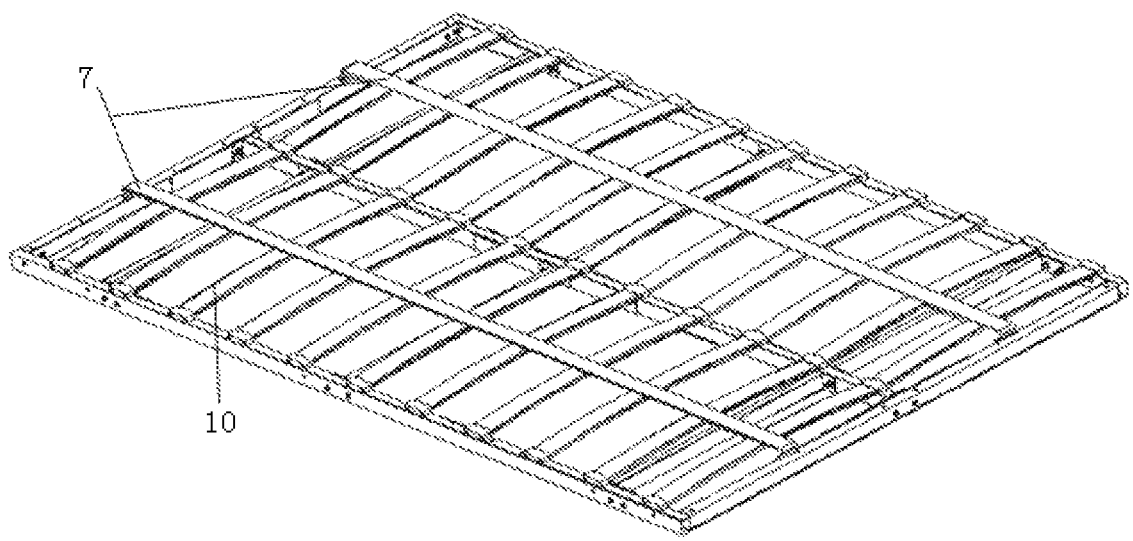
FIG. 1 is a schematic structural diagram of a first embodiment.
Figure 2:
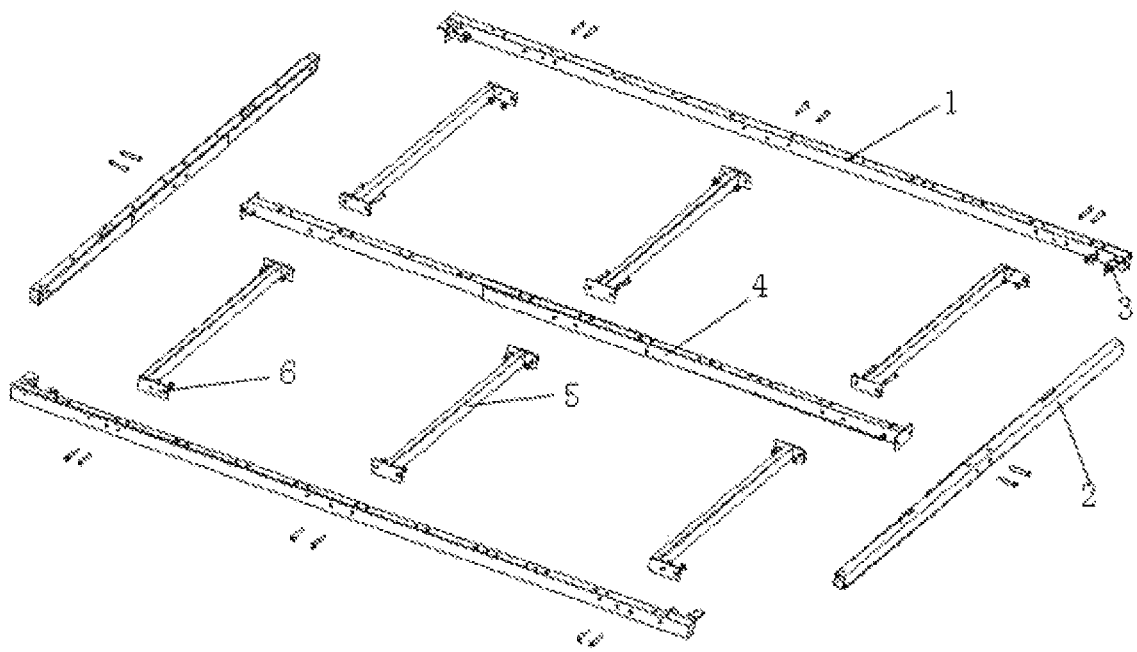
FIG. 2 is a schematic exploded view of an outer frame and an inner frame of the first embodiment.
Figure 3:
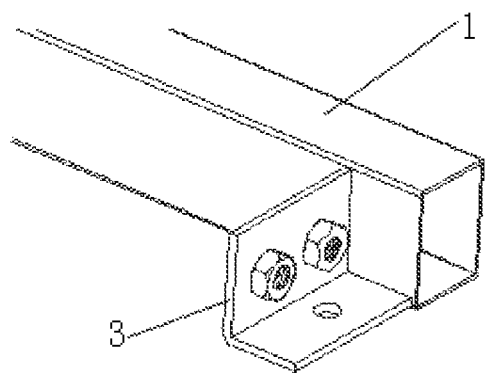
FIG. 3 is a schematic diagram of an L-shaped iron plate of the first embodiment.
Figure 4:
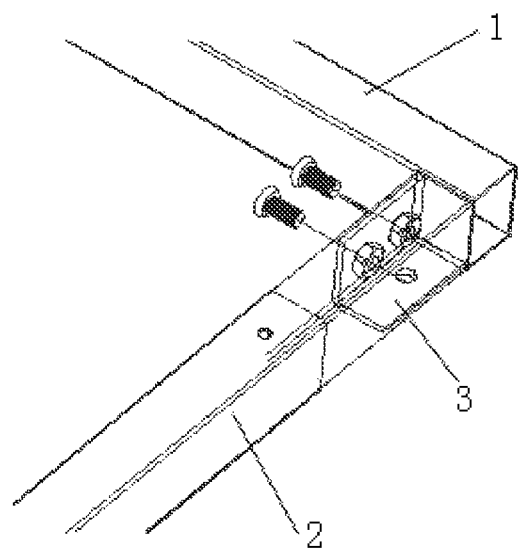
FIG. 4 is a schematic diagram of the first embodiment after being connected through the L-shaped iron plate.
Figure 5:
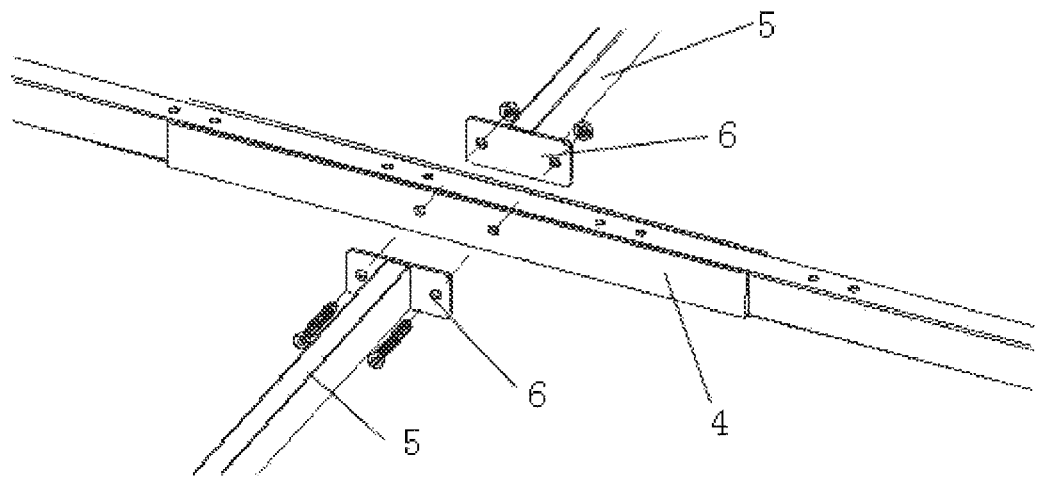
FIG. 5 is a schematic diagram of lateral connecting tubes interlocked through bolts of the first embodiment.

The following further describes the present invention with reference to the specific examples.

Embodiment 1

As shown in FIG. 1 to FIG. 5, a novel detachable bed frame assembly mechanism includes a bed frame body. The bed frame body includes an outer frame, an inner frame, and two sets of wooden strips.

The outer frame is a rectangular frame including two horizontal tubes 1, two lateral tubes 2, four L-shaped iron-plate connectors 3, bolts, and nuts. The two horizontal tubes and the two lateral tubes are connected through L-shaped iron plates, one of the L-shaped iron plates is disposed on an inner side of one of two ends of each of the two horizontal tubes, an opening of the L-shaped iron plate is orientated outward, one side of the L-shaped iron plate is connected to the inner side of the end of the horizontal tube, an outer end surface of the L-shaped iron plate is flush with an outer end surface of the horizontal tube, and the end of the lateral tube connected to the L-shaped iron plate is placed in the opening of the L-shaped iron plate and is fixed through the bolts and the nuts.

The inner frame includes at least one horizontal connecting tube 4, a plurality of lateral connecting tubes 5, iron sheets 6, bolts, and nuts. The horizontal connecting tube is connected between the two lateral tubes and is parallel to the horizontal tubes, the plurality of lateral connecting tubes are connected between the horizontal tubes and the horizontal connecting tube and are parallel to the lateral tubes, the lateral connecting tubes on both sides of the horizontal connecting tube are symmetrically disposed. The horizontal connecting tube is connected to the lateral tubes at both ends of the horizontal connecting tube through the iron sheets and is fixed through the bolts and the nuts. The lateral connecting tubes are connected to the horizontal tubes through the iron sheets and are fixed through the bolts and the nuts, ends of the lateral connecting tubes on both sides of the horizontal connecting tube are symmetrically disposed on outer sides of the horizontal connecting tube through the iron sheets and are fixed through the nuts after interlocked through the bolts.

Figure 8:
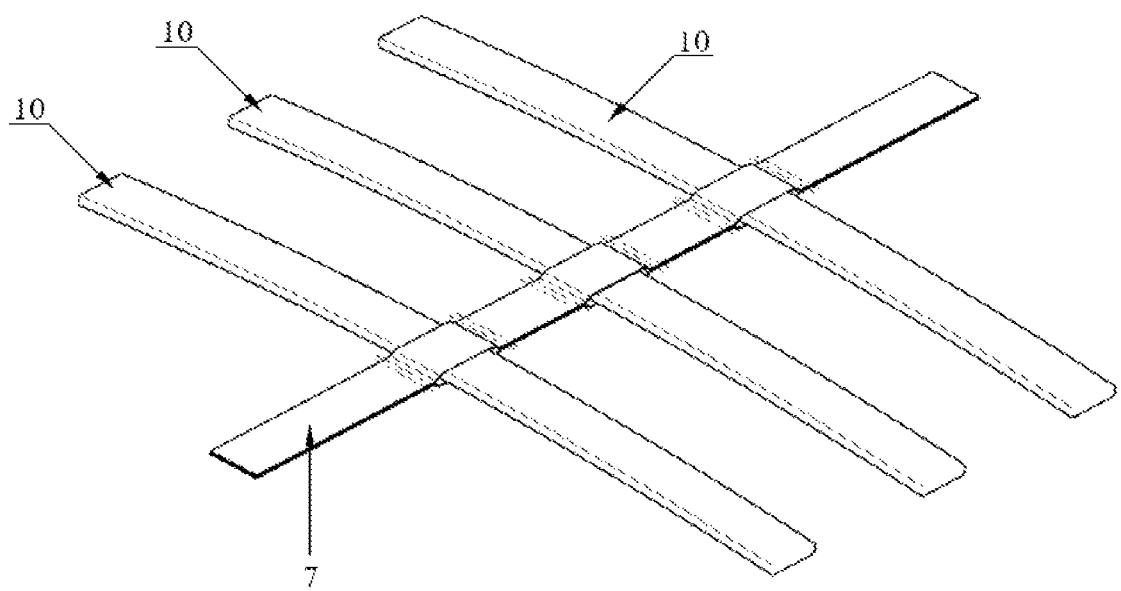
FIG. 8 is a partial schematic enlarged view of straps.
Figure 9:
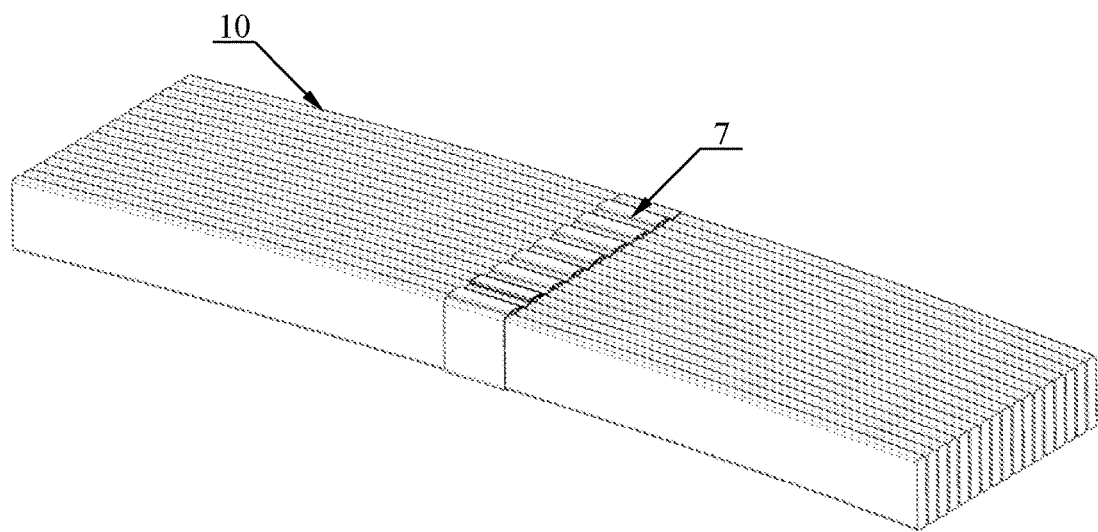
FIG. 9 is a schematic diagram of received wooden strips.

The two sets of wooden strips 10 are symmetrically disposed on the horizontal connecting tube and the horizontal tubes on both sides of the horizontal connecting tube and are parallel to the lateral tubes, to connect the horizontal connecting tube to the horizontal tubes. As shown in FIG. 8, the two sets of wooden strips arranged in parallel are respectively connected as a whole through one of the straps 7. All of the wooden strips are combined as a whole by using the straps, which can significantly increase overall strength and a load-bearing capability of a single wooden strip. In addition to the wooden strips, such strip combination manners can adopt the method. As shown in FIG. 9, the addition of the straps facilitates storage and mounting of the wooden strips. The wooden strips only need to be superimposed on each other with front surfaces and rear surfaces for storage and directly unfolded during mounting. In addition, the wooden strips can be better packaged for delivery after being connected by using the straps, which is convenient to operate.

Figure 10:
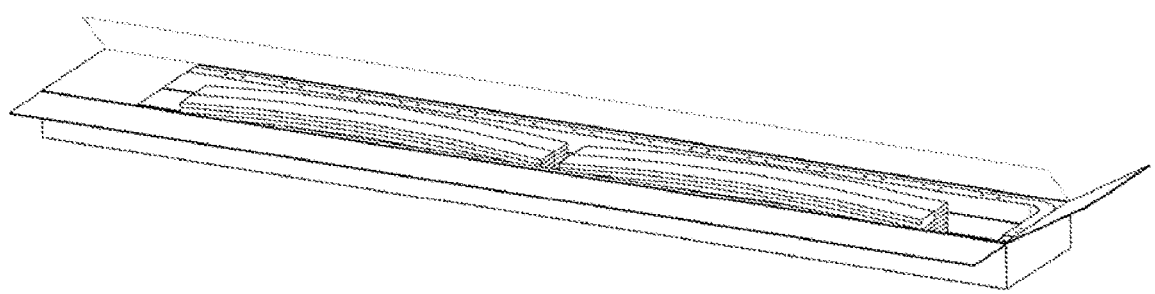
FIG. 10 is a schematic diagram of an effect of packing separated parts.
Figure 11:
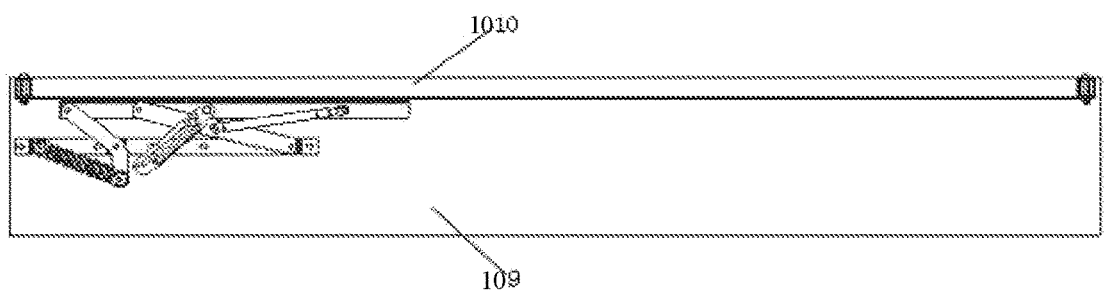
FIG. 11 shows an effect of closing an upper cover in a flip link mechanism.
Figure 12:
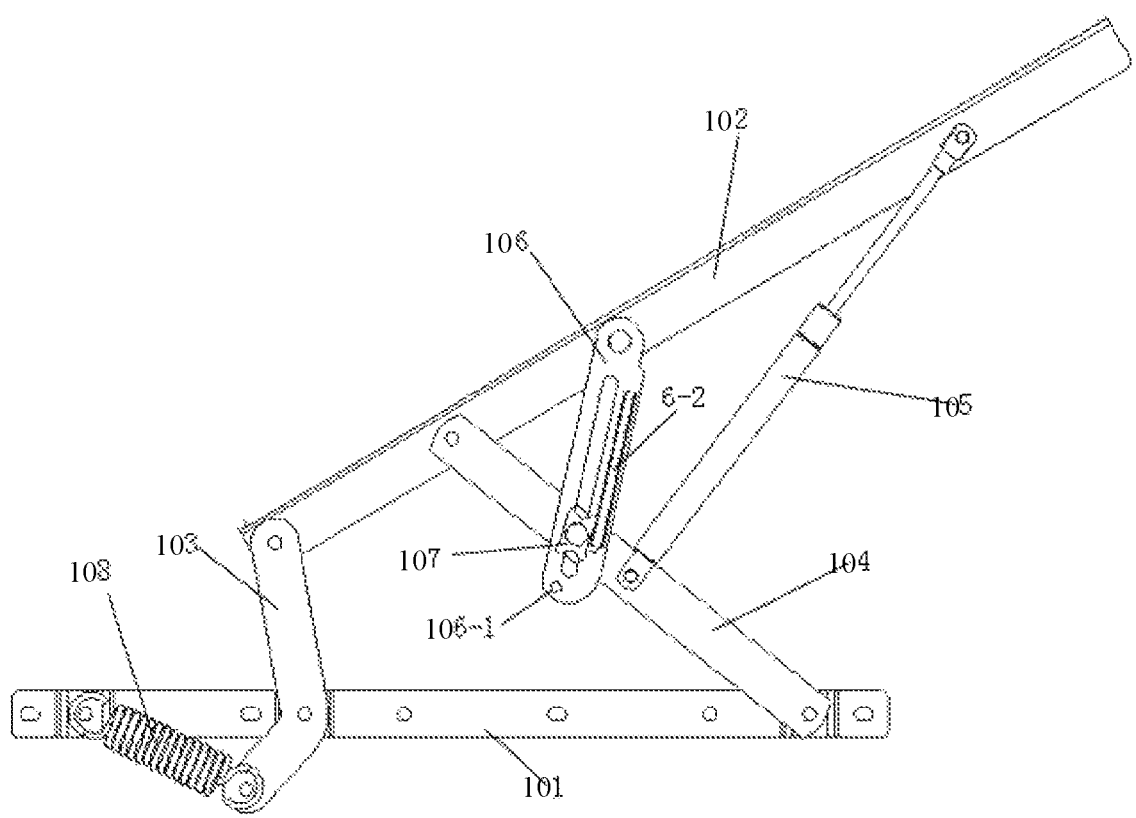
FIG. 12 shows an effect of opening the upper cover in the flip link mechanism.
Figure 13:
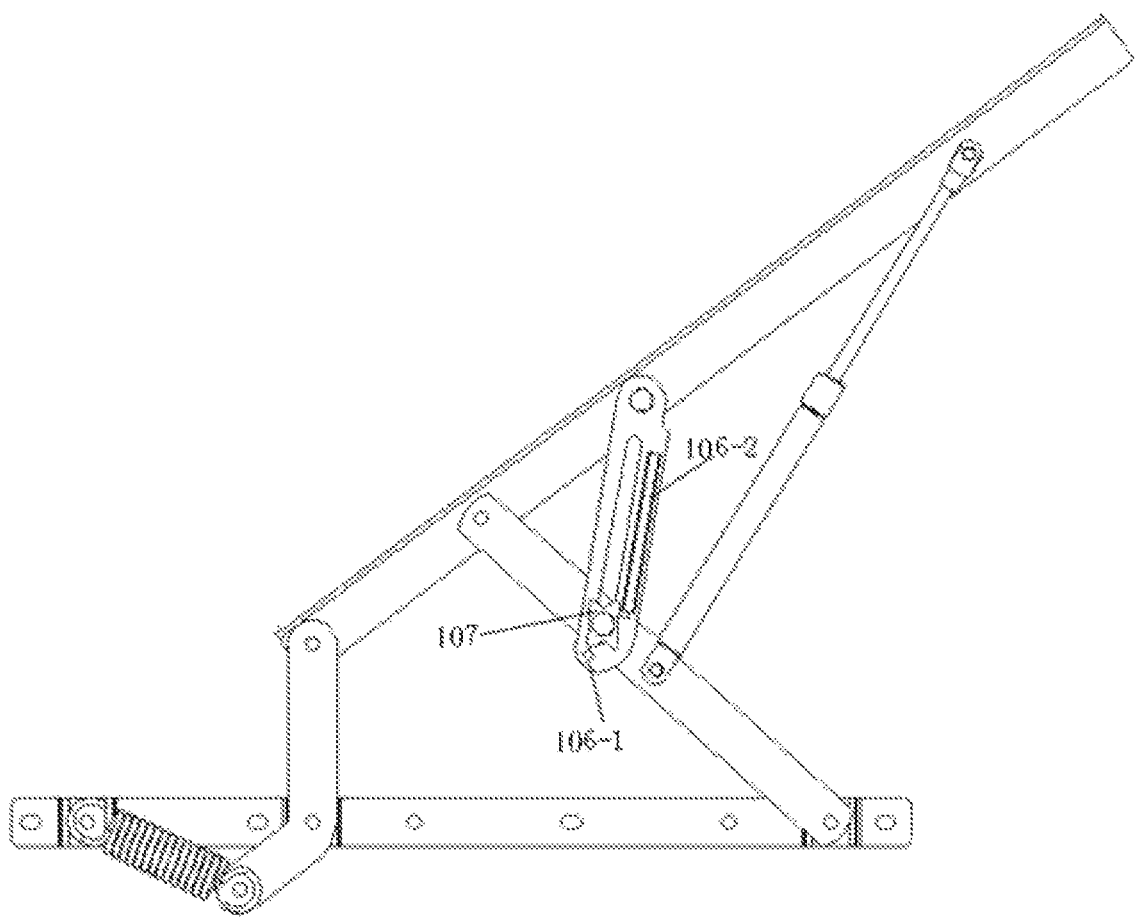
FIG. 13 shows a state in which a sliding link and a positioning slider in the flip link mechanism collide.
Figure 14:
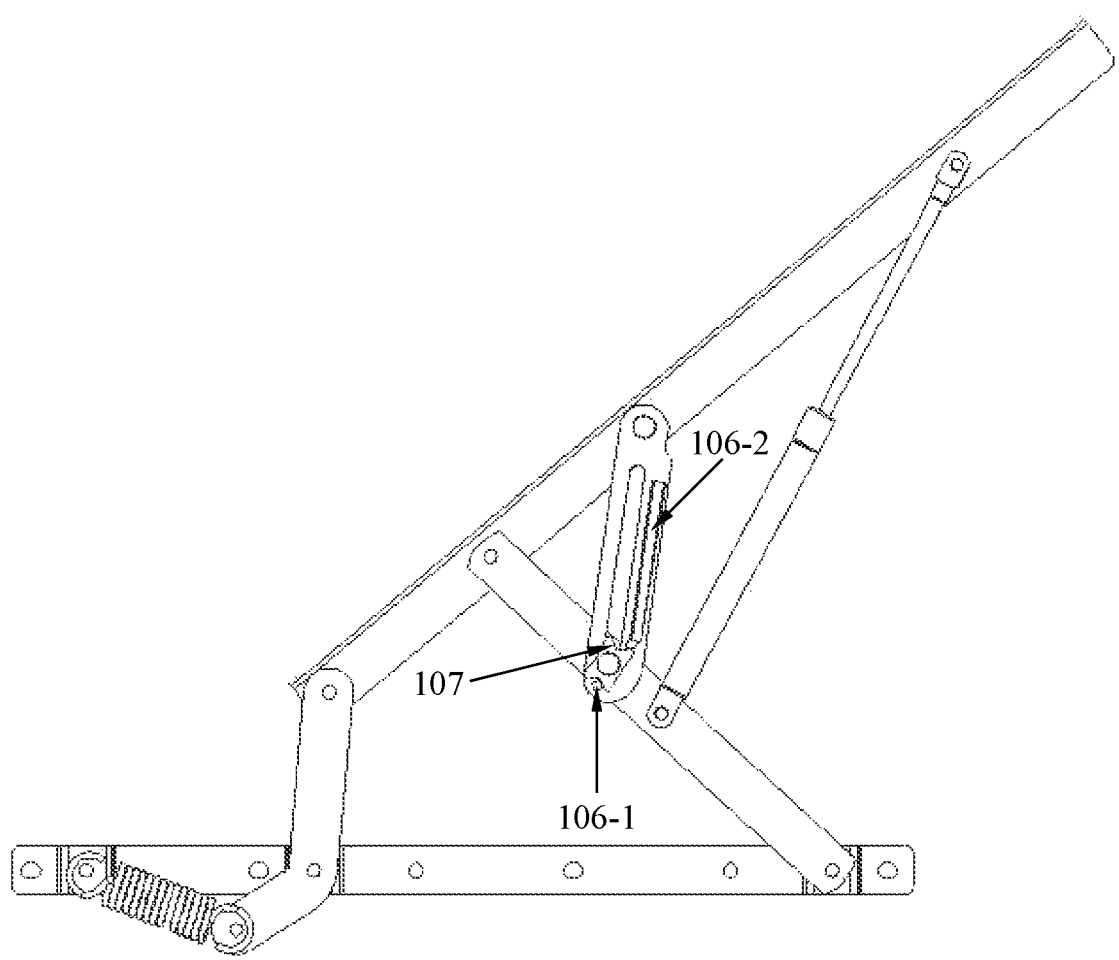
FIG. 14 shows a state in which the flip link mechanism is opened to a limiting position.
Figure 15:
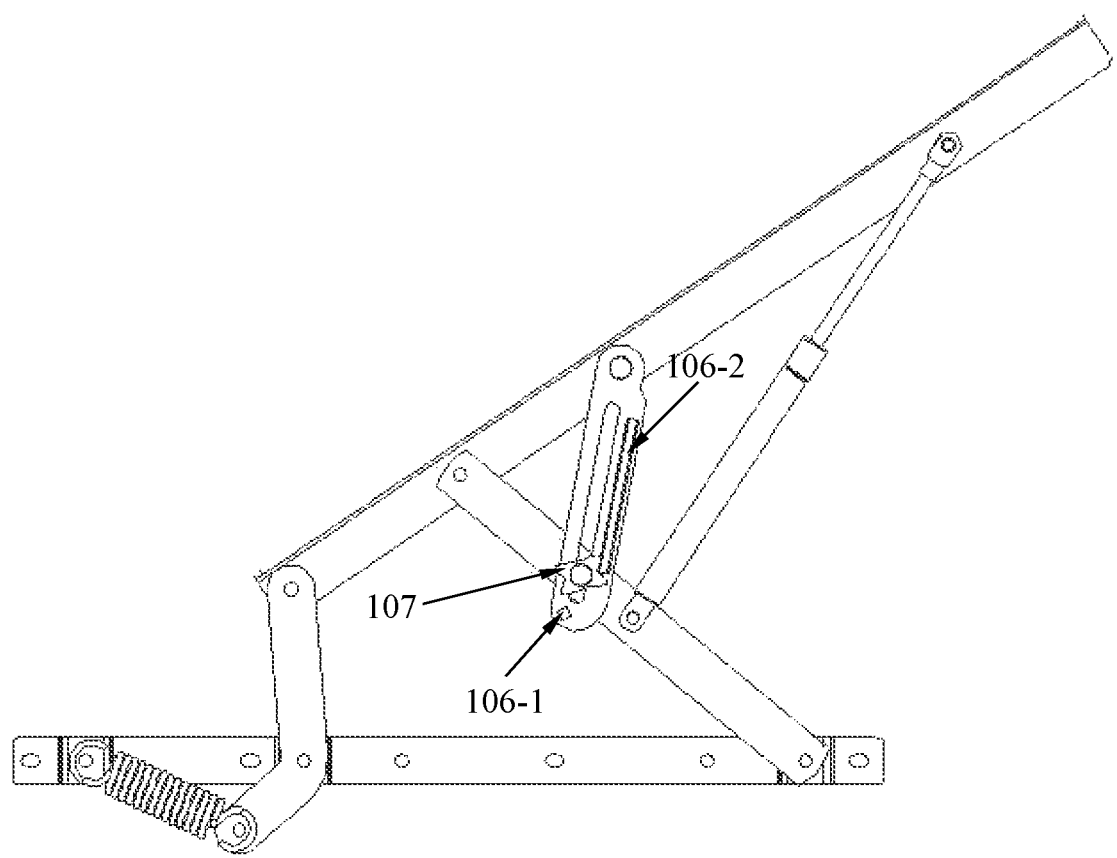
FIG. 15 shows a state in which mechanisms are self-locked in the flip link mechanism.
Figure 16:
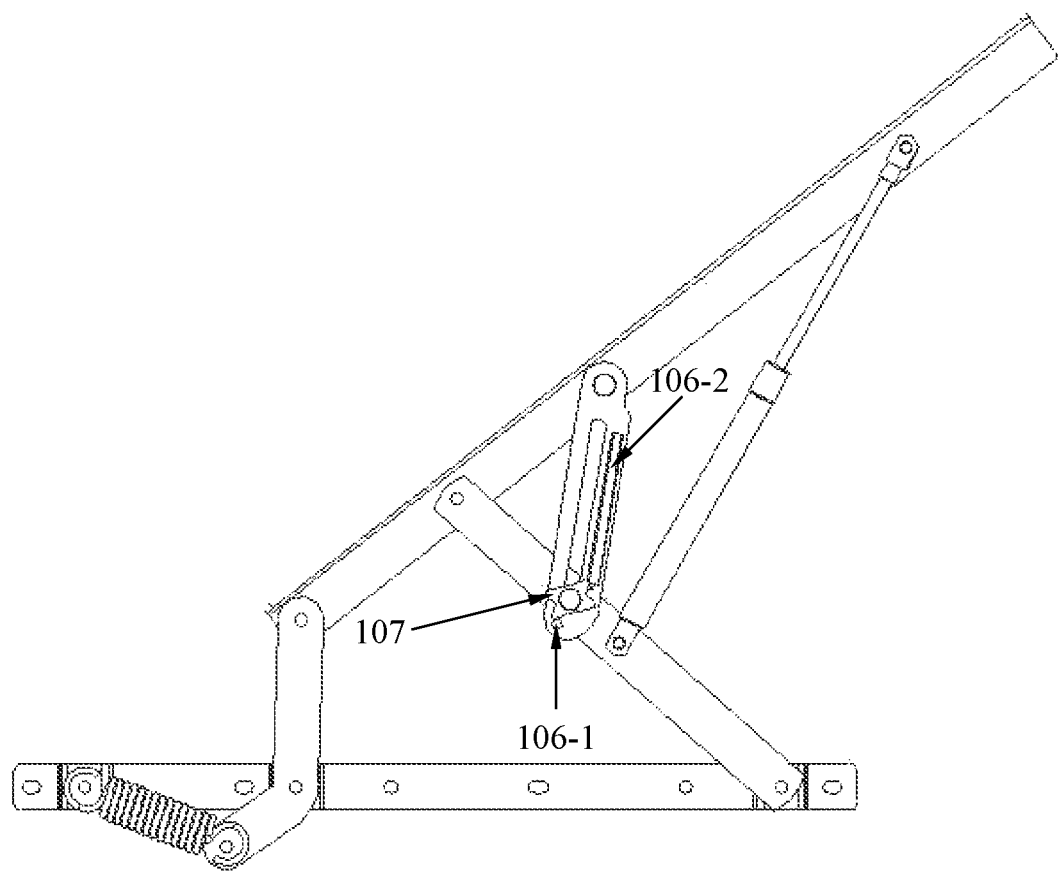
FIG. 16 shows a state in which the upper cover in the flip link mechanism is lifted to release the self-locking.
Figure 17:
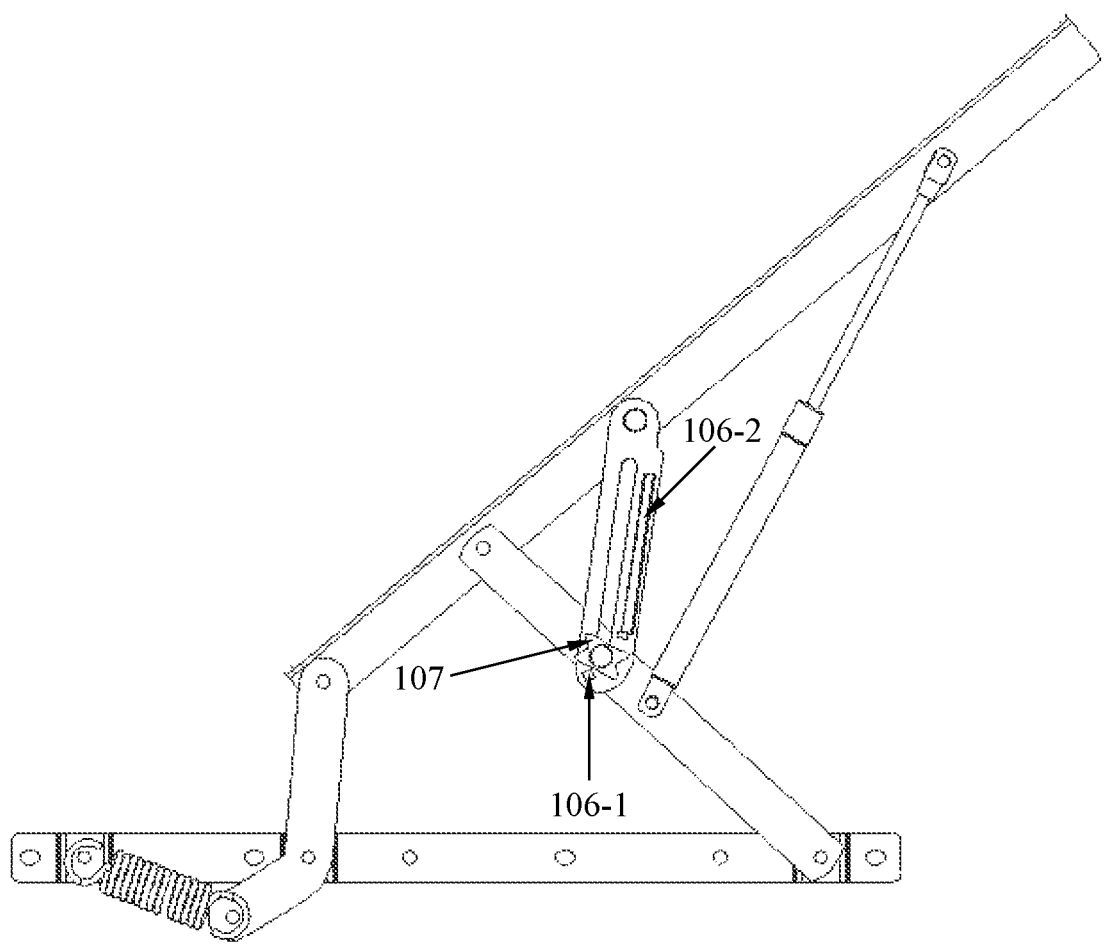
FIG. 17 shows a state in which the flip link mechanism reaches the limiting position again.
Figure 18:
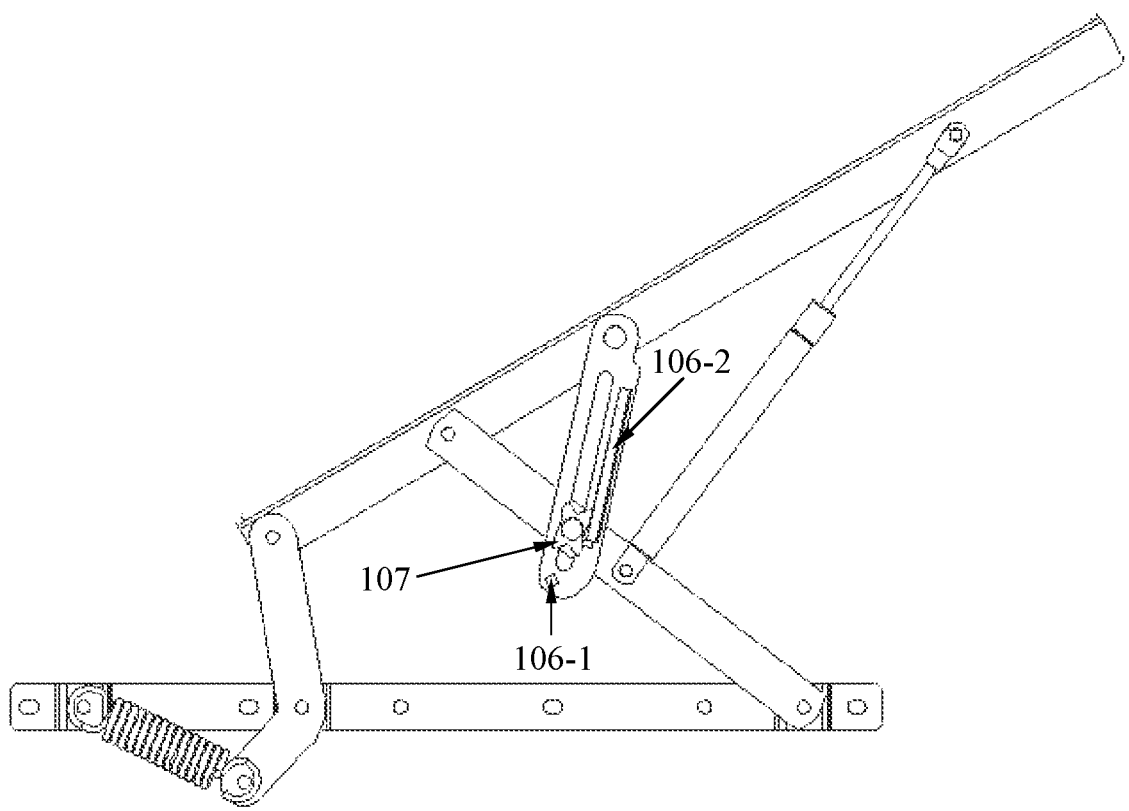
FIG. 18 shows a state of a folding process of the flip link mechanism.
Figure 19:
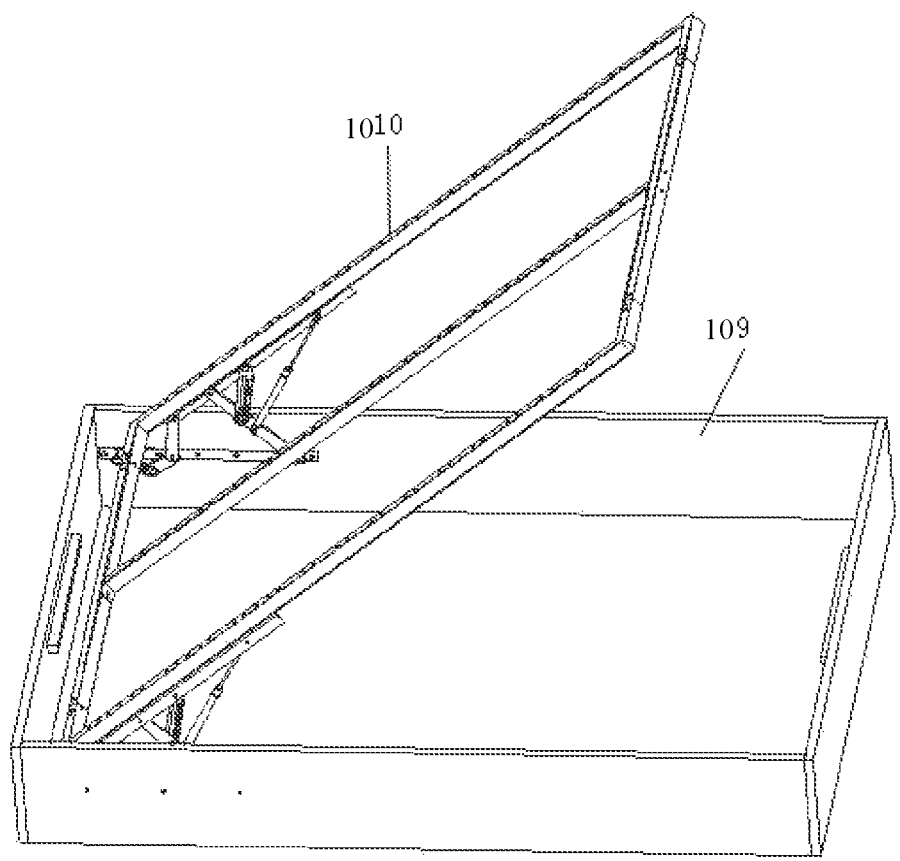
FIG. 19 is a three-dimensional schematic diagram of the flip link mechanism applied to a box structure in an opened state.

As shown in FIG. 10, The use of smaller packaging facilitates transportation for purchasers and reduces transportation costs. Not only the fun of DIY can be experienced during assembling, but also family members have more interaction.

Embodiment 2

Figure 6:
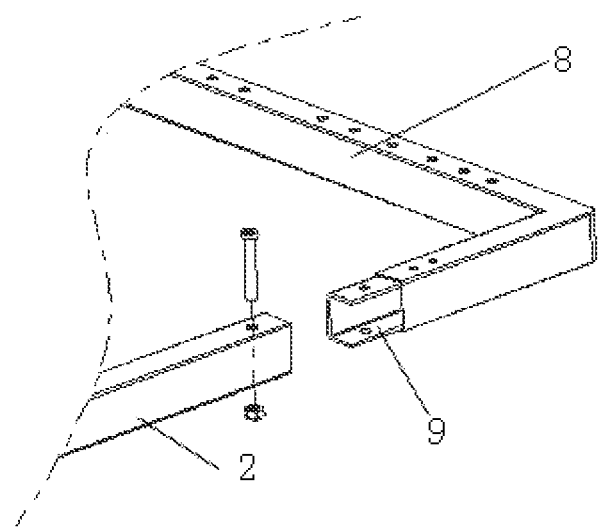
FIG. 6 is a schematic diagram of a joint between steel channels of a second embodiment.
Figure 7:
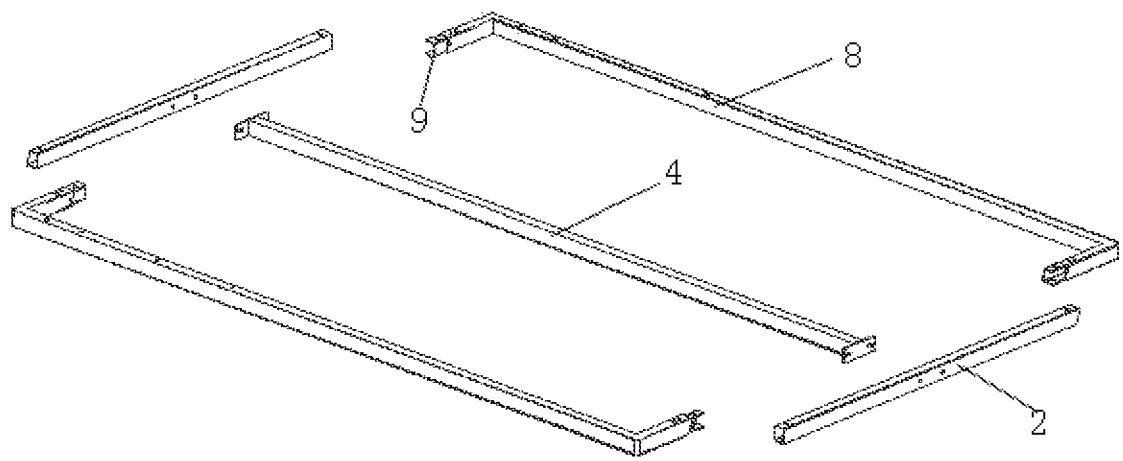
FIG. 7 is a schematic exploded view of the second embodiment.

As shown in FIG. 6 to FIG. 7, a novel detachable bed frame assembly mechanism includes a bed frame body. The bed frame body includes an outer frame, an inner frame, and two sets of wooden strips.

The outer frame is a rectangular frame including two door-shaped horizontal tubes 8, two lateral tubes, steel channels 9, bolts, and nuts. One end of each of the steel channels is disposed within a port of a lateral end of each of the two door-shaped horizontal tubes, and the other end of the two steel channels is disposed within each of the two lateral tubes and is fixedly connected to the lateral tube through the bolts and the nuts.

The inner frame includes at least one horizontal connecting tube, iron sheets, bolts, and nuts. The horizontal connecting tube is connected between the two lateral tubes and is parallel to the horizontal tubes, and the horizontal connecting tube is connected to the lateral tubes at both ends of the horizontal connecting tube through the iron sheets and is fixed through the bolts and the nuts.

The two sets of wooden strips are symmetrically disposed on the horizontal connecting tube and the horizontal tubes on both sides of the horizontal connecting tube and are parallel to the lateral tubes, to connect the horizontal connecting tube to the horizontal tubes.

The utility model adopts the L-shaped iron plate or the steel channel to connect the tubes, so that the connection is convenient and tight and the operation is simple. Operations of such parts are very simple for purchasers, an overall size after the connection is well controlled, and the simple design embodies simplicity and aesthetics of the product.

The parts are fixed and positioned through interlocking by using the bolts, which is simple to operate. In addition, overall strength is increased through iron connection, which is more effective than an ordinary strengthening way (enlargement, thickening, or the like of tubes), and a longitudinal load-bearing capability of the product is significantly increased after addition of the sheet metal.

Embodiment 3

As shown in FIG. 11 to FIG. 19, the flip link mechanism includes: a box mounting plate 101, an upper cover mounting plate 102, a first link 103, a second link 104, a pneumatic rod 105 having a low force value, a sliding link 106, a positioning slider 107, a booster tension spring 108, and a bump 106-1.

One end of the box mounting plate 101 is connected to one end of the first link 103 through the booster tension spring 108, the other end of the box mounting plate 101 is connected to one end of the second link 104, and the other end of the first link 103 is connected to one end of the upper cover mounting plate 102. One end of the sliding link 106 is connected in the middle of the second link 104, the other end of the sliding link 106 is connected in the middle of the upper cover mounting plate 102, the positioning slider 107 is slidable reciprocally in the sliding link 106 along a guide bar 106-2 and is rotatable by means of the bump 106-1 below a sliding chute on the sliding link 106. The other end of the second link 104 is connected to the upper cover mounting plate 102 and is located between the first link 103 and the sliding link 106, one end of the pneumatic rod 105 is connected to the other end of the upper cover mounting plate 102, and the other end of the pneumatic rod 105 is located at a lower part of the sliding link 106 and is connected in the middle of the second link 104.

The upper cover mounting plate 102 is provided with mounting holes, the bed frame body is also provided with mounting holes, and the mounting holes of the upper cover mounting plate 102 and the bed frame body are aligned with each other, a bolt-nut assembly is successively passed through the mounting holes of the upper cover mounting plate 102 and the bed frame body and is fastened, so that the bed frame body is connected and fixed with the flip link mechanism.

A movement principle of a link mechanism is as follows.

The box mounting plate 101 is fixed under a box 109 (at a storage position), and the upper cover mounting plate 102 is fixed to an upper cover 1010. When the upper cover is lifted, the link mechanism is slowly opened to a limiting opened state under the action of the booster tension spring, and the positioning slider and the sliding link also reach a limit state. Then the upper cover is pulled down, so that the positioning slider 107 is rotated by a specific angle under the action of the bump 106-1 on the sliding link 106. When the upper cover is pulled down again, the positioning slider and the sliding link are locked to prevent the upper cover from falling when the pneumatic rod 105 fails, and when the link mechanism is lifted to the limiting opened state again, the positioning slider falls. At this point, if the upper cover is pressed down again, the locked state is released. The upper cover may be pressed down, and when the upper cover is about to reach a closed state, the booster tension spring 108 between the box mounting plate 101 and the first link 102 provides a boosting force to prevent fingers from being injured by sudden falling and closing.

Due to an excessively large angle of the pneumatic rod during closing, a vertical upward force that is provided is relatively small, but increasing the force value of the pneumatic rod causes the upper cover to bounce excessively fast during lifting. Therefore, in this application, the booster tension spring 108 is added at the end, so that a boosting force can be provided in the folded state without needing to increase the force value of the pneumatic rod 105 to eliminate the safety hazard of injuring people when the upper cover bounces.

The booster tension spring 108 at the end provides a boosting force during initial lifting of the upper cover to facilitate the lifting of the upper cover, and provides the boosting force when the upper cover is to be folded and closed to eliminate the safety hazards of squeezing fingers.

The sliding link 106 and the positioning slider 107 form a self-locking mechanism. When the upper cover is opened to the limiting position and pressed down again, the self-locking mechanism locks the upper cover, so that the upper cover does not fall again. When the upper cover is lifted and then pulled down, the self-locking is released and the upper cover can be folded and closed. The self-locking mechanism can eliminate the safety hazard of sudden falling of the upper cover when the pneumatic rod fails in the opened state.

The pneumatic rod 105, the second link 104, and the upper cover mounting plate 102 form a triangular structure, which is more stable during opening and closing of the mechanism.

Figure 20:
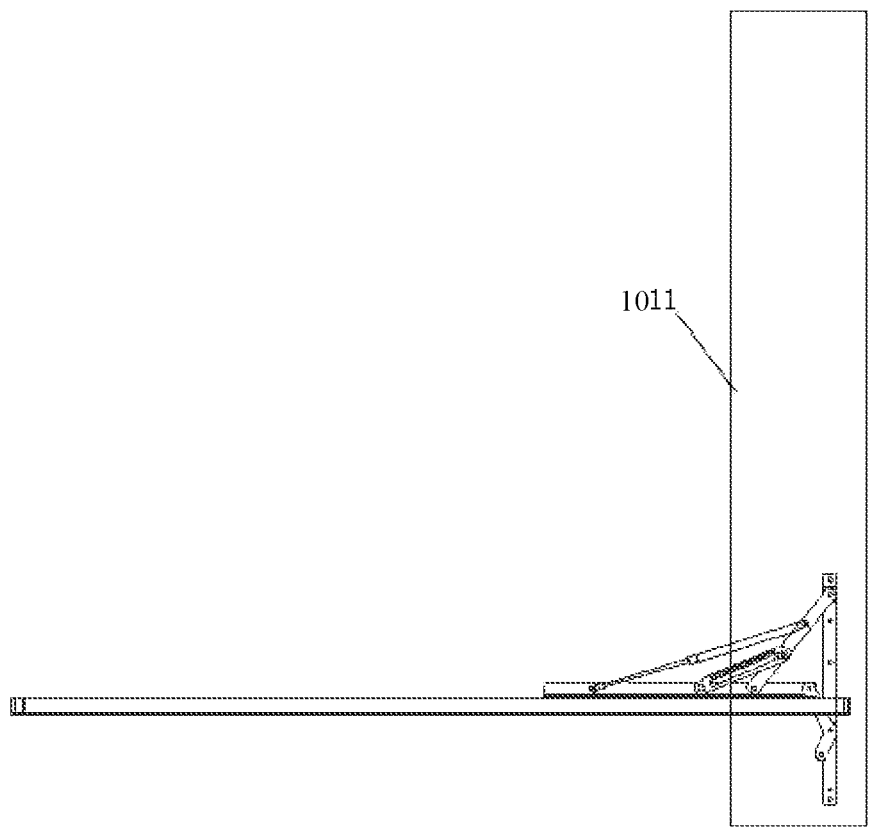
FIG. 20 is a schematic diagram of the flip link mechanism applied to a wall bed structure.
Figure 21:
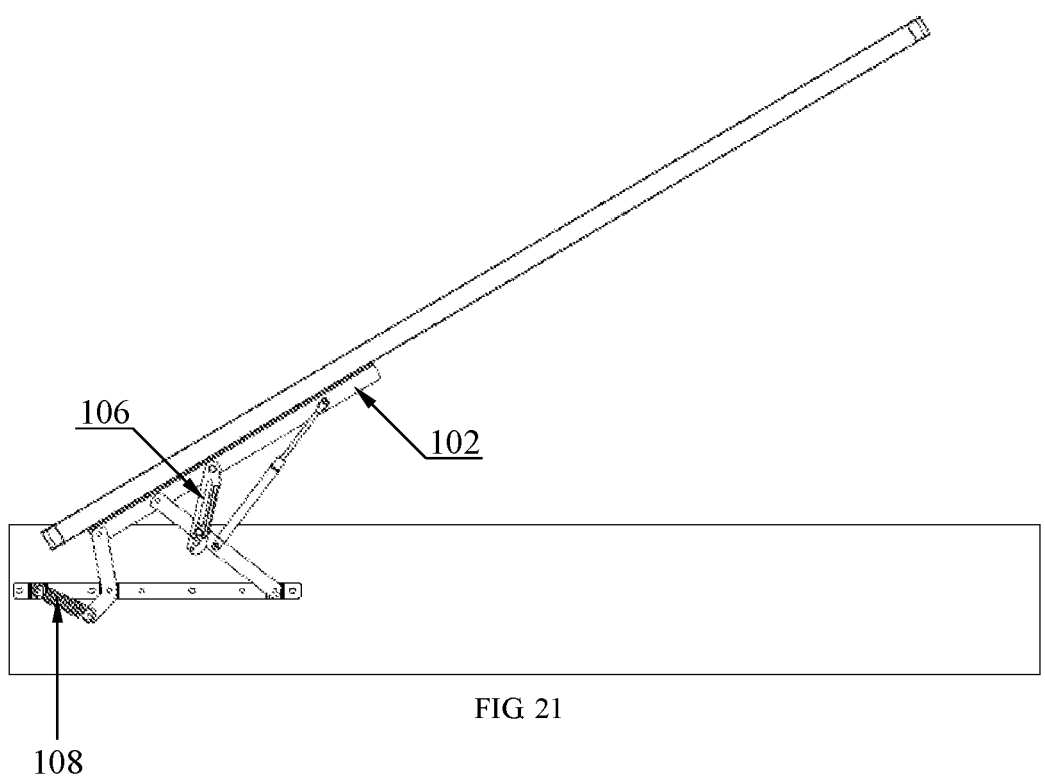
FIG. 21 is a schematic diagram of the connection of the flip link mechanism and the bed frame body.

As shown in FIG. 20, the self-locking structure of this application may also be used for a wall bed structure 1011 to prevent spring back.

What is claimed is:

1. A detachable bed frame assembly mechanism comprising:
   a bed frame body comprising an outer frame, an inner frame, and at least one set of wooden strips (10);
   the outer frame is a rectangular frame comprising two horizontal tubes (1), two lateral tubes (2), four L-shaped iron-plate (3) connectors, bolts, and nuts; wherein the two horizontal tubes (1) and the two lateral tubes (2) are connected through L-shaped iron plates (3), each L-shaped iron plates (3) is disposed on an end of each one of the two horizontal tubes or the two lateral tubes, an opening of the L-shaped iron plate is orientated outward, one side of the L-shaped iron plate (3) is connected to the inner side of the horizontal tube (1) or the lateral tube (2), an end of the lateral tube (2) or the horizontal tube (1) is placed in the opening of the L-shaped iron plate (3) and is fixed through the bolts and the nuts;
   the inner frame comprises at least one horizontal connecting tube (4), a plurality of lateral connecting tubes (5), iron sheets (6), bolts, and nuts, wherein the horizontal connecting tube (4) is connected with the two lateral tubes (2) by the iron sheet (6) with bolt and nut and is parallel to the horizontal tubes (1), the plurality of lateral connecting tubes (5) are connected the horizontal tubes (1) with the horizontal connecting tube (4) by iron sheets (6) with bolts and nuts and are parallel to the lateral tubes (2);
   the wooden strips (10) are symmetrically disposed on the horizontal connecting tube (4) and the horizontal tubes (1) and are parallel to the lateral tubes (2);
   a flip link mechanism comprises a box mounting plate (101), an upper cover mounting plate (102), a first link (103), a second link (104), a pneumatic rod (105), a sliding link (106), a positioning slider (107), and a bump (106-1), wherein
   one end of the box mounting plate (101) is connected to one end of the first link (103), the other end of the box mounting plate (101) is connected to one end of the second link (104), the other end of the first link (103) is connected to one end of the upper cover mounting plate (102), one end of the sliding link (106) is connected in the middle of the second link (104), the other end of the sliding link (106) is connected in the middle of the upper cover mounting plate (102), the positioning slider (107) is slidable reciprocally in the sliding link (106) along a guide bar and is rotatable by means of the bump (106-1) below a sliding chute on the sliding link (106), and the other end of the second link (104) is connected to the upper cover mounting plate (102) and is located between the first link (103) and the sliding link (106), one end of the pneumatic rod (105) is connected to the other end of the upper cover mounting plate (102), and the other end of the pneumatic rod (105) is located at a lower part of the sliding link (106) and is connected in the middle of the second link (104), and wherein
   the upper cover mounting plate (102) is fixed with the bed frame body.

2. The detachable bed frame assembly mechanism according to claim 1, further comprising straps, wherein the wooden strips (7) arranged in parallel are connected as a whole through one of the straps (7).

3. The detachable bed frame assembly mechanism according to claim 1, further comprising a booster tension spring (108), wherein the one end of the box mounting plate (101) is connected to the one end of the first link (103) through the booster tension spring (108).

4. A detachable bed frame assembly mechanism, comprising:
   a bed frame body comprising an outer frame, an inner frame, and at least one set of wooden strips (10), wherein
   the outer frame is a rectangular frame comprising two door-shaped horizontal tubes (8), two lateral tubes (2), steel channels (9), bolts, and nuts, wherein one end of each of the steel channels (9) is disposed within a port of a lateral end of each of the two door-shaped horizontal tubes (8), and the other end of the two steel channels (9) is disposed within each of the two lateral tubes (2) and is fixedly connected to the lateral tube (2) through the bolts and the nuts;
   the inner frame comprises at least one horizontal connecting tube (4), iron sheets (6), bolts, and nuts, wherein the horizontal connecting tube (4) is connected between the two lateral tubes (2) and is parallel to the horizontal tubes (1), and the horizontal connecting tube (4) is connected to the lateral tubes (2) at both ends of the horizontal connecting tube (4) through the iron sheets (6) and is fixed through the bolts and the nuts; and
   the wooden strips (10) are symmetrically disposed on the horizontal connecting tube (4) and the horizontal tubes (1) on both sides of the horizontal connecting tube (4) and are parallel to the lateral tubes (2), to connect the horizontal connecting tube (4) to the horizontal tubes (1);
   a flip link mechanism comprises a box mounting plate (101), an upper cover mounting plate (102), a first link (103), a second link (104), a pneumatic rod (105), a sliding link (106), a positioning slider (107), and a bump (106-1), wherein
   one end of the box mounting plate (101) is connected to one end of the first link (103), the other end of the box mounting plate (101) is connected to one end of the second link (104), the other end of the first link (103) is connected to one end of the upper cover mounting plate (102), one end of the sliding link (106) is connected in the middle of the second link (104), the other end of the sliding link (106) is connected in the middle of the upper cover mounting plate (102), the positioning slider (107) is slidable reciprocally in the sliding link (106) along a guide bar and is rotatable by means of the bump (106-1) below a sliding chute on the sliding link (106), and the other end of the second link (104) is connected to the upper cover mounting plate (102) and is located between the first link (103) and the sliding link (106), one end of the pneumatic rod (105) is connected to the other end of the upper cover mounting plate (102), and the other end of the pneumatic rod (105) is located at a lower part of the sliding link (106) and is connected in the middle of the second link (104), and wherein
   the upper cover mounting plate (102) is fixed with the bed frame body.

5. The detachable bed frame assembly mechanism according to claim 4, further comprising a booster tension spring (108), wherein the one end of the box mounting plate (101) is connected to the one end of the first link (103) through the booster tension spring (108).

* * * * *